US008310178B2

United States Patent
Maeda (10) Patent No.: US 8,310,178 B2
(45) Date of Patent: Nov. 13, 2012

(54) MOTOR CONTROL APPARATUS AND IMAGE FORMING APPARATUS

(75) Inventor: Yoritsugu Maeda, Moriya (JP)

(73) Assignee: Canon Kabushiki Kaisha, Tokyo (JP)

( * ) Notice: Subject to any disclaimer, the term of this patent is extended or adjusted under 35 U.S.C. 154(b) by 242 days.

(21) Appl. No.: 12/707,362

(22) Filed: Feb. 17, 2010

(65) Prior Publication Data

US 2010/0220982 A1 Sep. 2, 2010

(30) Foreign Application Priority Data

Feb. 27, 2009 (JP) ................................. 2009-046210

(51) Int. Cl.
*H02P 1/00* (2006.01)

(52) U.S. Cl. ........ 318/255; 318/256; 318/257; 318/258; 318/259; 318/260; 318/810; 318/811

(58) Field of Classification Search .................. 318/255, 318/256–260, 810, 811
See application file for complete search history.

(56) References Cited

U.S. PATENT DOCUMENTS

| 5,148,089 A * | 9/1992 | Adachi et al. ................... 318/66 |
| 6,418,274 B2 * | 7/2002 | Tanaka ........................... 388/800 |
| 6,756,760 B2 * | 6/2004 | Tanaka et al. .................. 318/560 |
| 6,768,235 B2 * | 7/2004 | Tsujimoto et al. ........... 310/75 R |
| 7,365,505 B2 * | 4/2008 | Okamoto .................... 318/254.1 |
| 7,417,400 B2 * | 8/2008 | Takeishi et al. ................ 318/599 |

FOREIGN PATENT DOCUMENTS

| JP | 07-039181 A | 2/1995 |
| JP | 2003-209990 A | 7/2003 |
| JP | 2005-287206 A | 10/2005 |
| JP | 2007-156238 A | 6/2007 |

* cited by examiner

*Primary Examiner* — Bentsu Ro
*Assistant Examiner* — David Luo
(74) *Attorney, Agent, or Firm* — Canon USA Inc. IP Division (57) ABSTRACT

A motor control apparatus for controlling a DC motor includes a detection unit configured to detect an angular speed of the DC motor, and a control unit configured to, when the DC motor is accelerated, increase a control value that controls a driving of the DC motor at a constant rate from a first control value corresponding to an angular speed lower than a target angular speed up to a second control value corresponding to an angular speed higher than the target angular speed, and switch the control value that controls the driving of the DC motor to a control value corresponding to the target angular speed in response to the detection result of the detection unit reaching the target angular speed.

10 Claims, 11 Drawing Sheets

MOTOR CONTROL APPARATUS AND IMAGE FORMING APPARATUS

BACKGROUND OF THE INVENTION

1. Field of the Invention

The present invention relates to a motor control apparatus for controlling a direct current (DC) motor and an image forming apparatus including the motor control apparatus.

2. Description of the Related Art

There are copying machines and printers, in which a toner image is formed on photosensitive drums and transferred to an intermediate transfer belt, and the toner image is transferred from the intermediate transfer belt to paper. To obtain better image quality, those machines are configured such that separate motors are used to drive the photosensitive drums and the intermediate transfer belt. In this case, since the photosensitive drums and the intermediate transfer belt contact with each other at positions of image transfer, if there is a difference between their circumferential speeds when they rotate, their surfaces may get scratched. There is no such problem when the circumferential speeds of the photosensitive drums and the intermediate transfer belt are controlled to a target speed. However, when the photosensitive drums and the intermediate transfer belt are driven by separate motors (DC motors, for example), the motor startup characteristics (e.g., overshoot) from when a motor is started and accelerated until its speed rises up to a target angular speed differ depending on motors. Therefore, so long as the startup characteristics of the motors cannot be made equal, a difference arises in the circumferential speed between the photosensitive drums and the intermediate transfer belt.

It has been proposed to increase a pulse width modulation (PWM) signal, which controls the revolution number, from a low duty ratio at a predetermined increase rate to start a DC motor with little overshoot (Japanese Patent Application Laid-Open No. 1995-039181). In addition, it has been proposed to control a clock frequency which is to be input to a DC motor, to be a frequency lower than a target frequency when the DC motor is started and accelerated, and then increase the clock frequency input to the DC motor to the target frequency (Japanese Patent Application Laid-Open No. 2007-156238).

Figure 11A:
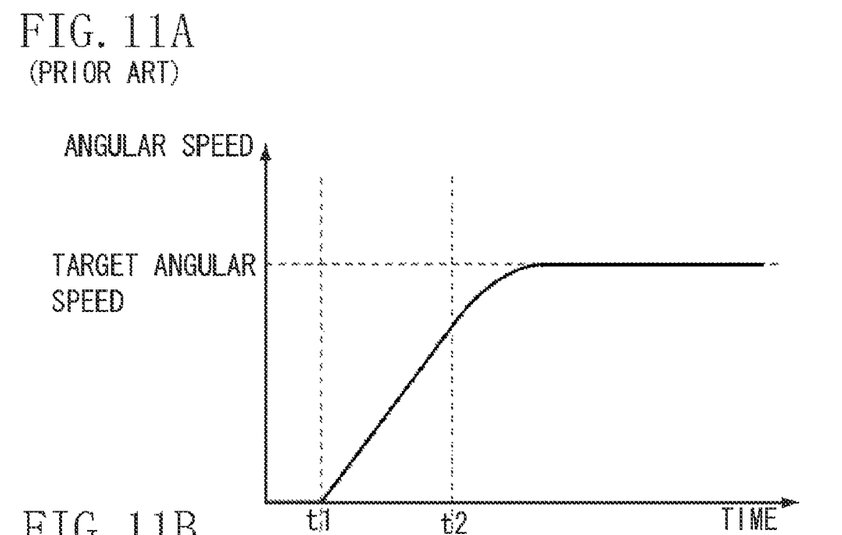
FIGS. 11A and 11B are diagrams illustrating a conventional relation between control values and angular speeds (FIGS. 11A and 11b should be labeled "PRIOR ART").
Figure 11B:
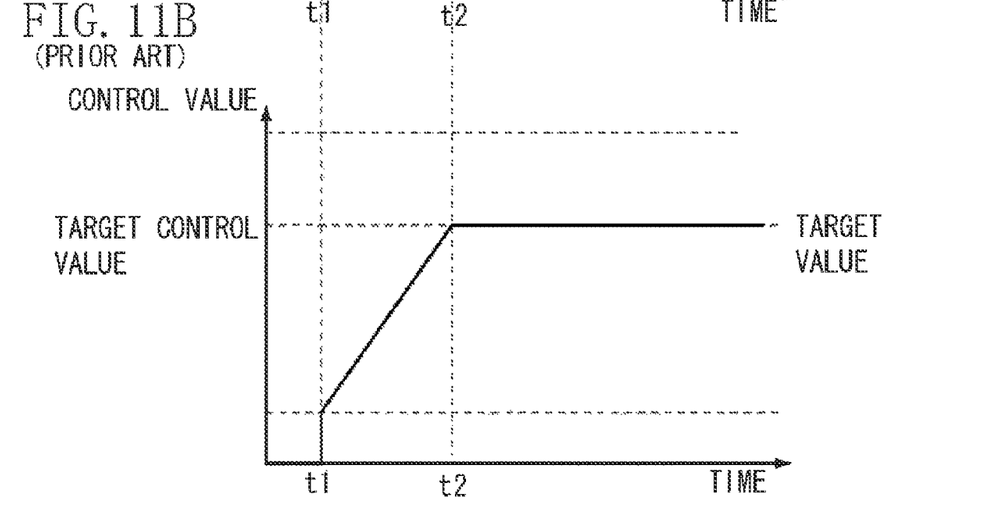

However, in FIG. 11B, even if the angular speed is controlled to start at a low control value, when a DC motor is started and accelerated, and increase to a target control value, when the angular speed comes closer to the target angular speed, its increase turns to be non-linear, as illustrated in FIG. 11A, though the angular speed of the DC motor increases linearly up to halfway to the target angular speed. It is difficult to match the nonlinear characteristics among the different motors. Therefore, if the angular speeds of DC motors can be started and accelerated linearly up to the target value, startup characteristics of the motors can be brought in line.

SUMMARY OF THE INVENTION

The present invention is directed to enabling the angular speed of a motor to increase to a target angular speed at a predetermined rate.

According to an aspect of the present invention, a motor control apparatus for controlling a DC motor includes a detection unit configured to detect an angular speed of the DC motor, and a control unit configured to, when the DC motor is accelerated, increase a control value that controls a driving of the DC motor at a constant rate from a first control value corresponding to an angular speed lower than a target angular speed up to a second control value corresponding to an angular speed higher than the target angular speed, and switch the control value that controls the driving of the DC motor to a control value corresponding to the target angular speed in response to the detection result of the detection unit reaching the target angular speed.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
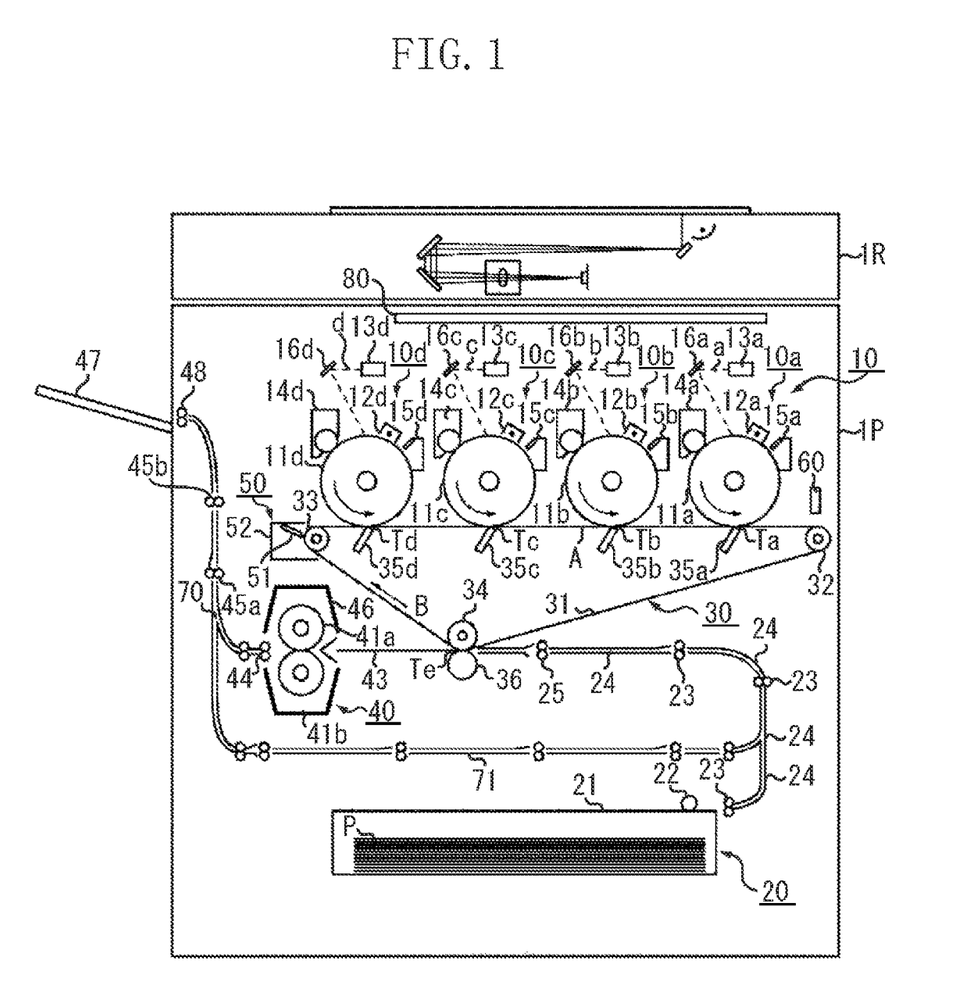
FIG. 1 is a sectional view of a color copying machine according to an exemplary embodiment of the present invention.

FIG. 1 is a sectional view of an image forming apparatus according to an exemplary embodiment of the present invention. A color copying machine according to this exemplary embodiment has a plurality of image forming units arranged in parallel, and operates by an intermediate transfer method. The color copying machine includes an image reading section 1R and an image output section 1P.

The image reading section 1R optically reads a document image, converts it into an electric signal, and sends this signal to the image output section 1P. The image output section 1P includes a plurality of image forming units 10a, 10b, 10c, and 10d arranged side by side, a sheet feeding unit 20, an intermediate transfer unit 30, a fixing unit 40, a cleaning unit 50, a photo sensor 60, and a control unit 80.

The respective units are described in detail. The image forming units 10a, 10b, 10c, and 10d have the same structure. The photosensitive drums 11a, 11b, 11c, and 11d as first image carriers, which are rotatably supported by a rotary shaft, are driven in a direction indicated by an arrow. Primary charging units 12a, 12b, 12c, and 12d, exposure units 13a, 13b, 13c, and 13d, folding mirrors 16a, 16b, 16c, and 16d, developing apparatuses 14a, 14b, 14c, and 14d, and cleaning units 15a, 15b, 15c, and 15d are arranged in a rotating direction of the photosensitive drums 11a to 11d facing the outer circumferential faces of the drums.

The primary charging units 12a to 12d give uniform electric charge to the outer circumferential faces of the photosensitive drums 11a to 11d. In response to an image record signal from the image reading section 1R, the exposure units 13a to 13d apply a laser beam to the photosensitive drums 11a to 11d via the folding mirrors 16a to 16d. In this manner, electrostatic latent images are formed on the photosensitive drums 11a to 11d.

The electrostatic latent images on the photosensitive drums 11a to 11d are visualized by the developing apparatuses 14a to 14d which carry four color developers (hereafter called toner), namely, yellow, cyan, magenta, and black. The visible images (toner images) are transferred to an intermediate transfer belt 31 serving as a second image carrier in the intermediate transfer unit 30 at image transfer positions Ta, Tb, Tc, and Td.

The cleaning units 15a, 15b, 15c, and 15d provided downstream of the image transfer positions Ta, Tb, Tc, and Td clean the surfaces of the photosensitive drums by scraping off the remaining toner on the drums which is not transferred to the intermediate transfer belt 31. By the process described above, the images are formed by successively repeating development using color toners.

A sheet feeding unit 20 includes a cassette 21 to store sheet P, a pickup roller 22 to send out sheets P one by one from the cassette 21, and a sheet feeding roller pair 23 to further transport the sheets P sent from the pickup roller 22. The sheet feeding unit 20 further includes a sheet feeding guide 24 and a registration roller pair 25 to send out the sheets P to a secondary transfer position Te in time with images on the intermediate transfer belt 31.

The intermediate transfer unit 30 will now be described in detail. The intermediate transfer belt 31 is held by a drive roller 32 which transmits driving force to the intermediate transfer belt 31, by a driven roller 33 driven by rotation of the intermediate transfer belt 31, and by a secondary transfer counter roller 34. A primary transfer plane A is formed between the drive roller 32 and the driven roller 33. The drive roller 32 is rotated by a motor (not illustrated).

At the primary transfer positions Ta to Td where the photosensitive drums 11a to 11d face the intermediate transfer belt 31, primary transfer chargers 35a to 35d are arranged at the back of the intermediate transfer belt 31. On the other hand, the secondary transfer counter roller 34 and the secondary transfer roller 36 are disposed to face each other. A secondary transfer position Te is formed by a nip between the secondary transfer roller 36 and the intermediate transfer belt 31. The secondary transfer roller 36 is pressurized to the intermediate transfer belt 31 with an appropriate pressure.

A cleaning unit 50 configured to clean the image forming side of the intermediate transfer belt 31 is provided on the downstream side of the secondary transfer position Te of the intermediate transfer belt 31. The cleaning unit 50 includes a cleaning blade 51 configured to remove the toner on the intermediate transfer belt 31 and a waste toner box 52 to collect the waste toner scraped off by the cleaning blade 51.

A fixing unit 40 includes a fixing roller 41a containing a heat source, such as a halogen heater and a fixing roller 41b pressed to the fixing roller 41a. The fixing unit 40 further includes a guide 43 configured to guide a sheet P into a nip area between the fixing rollers 41a and 41b, and a fixing-unit heat insulation cover 46 configured to contain the heat of the fixing unit 40. Furthermore, the fixing unit includes discharge rollers 44, two pairs of vertical pass rollers 45a, 45b, and discharge rollers 48 used to lead a sheet P discharged from the fixing rollers 41a, 41b to the outside of the color copying machine, and also to a discharge tray 47 in which the sheets P are stacked.

Next, the operation of the above color copying machine is described in the following. When a central processing unit (CPU) issues an image formation start signal, a recording sheet starts to be fed from the cassette 21. When a sheet is fed from the cassette 21, for example, the pickup roller 22 starts to feed sheets P one by one from the cassette 21. The sheet feeding roller pair 23 transports a sheet P to the registration roller pair 25 guided through the sheet feeding guide 24 by the sheet feeding roller pairs 23. At this point in time, the registration roller pair 25 is stationary, and a leading edge of the sheet P runs into the nip of the registration roller pair 25. Subsequently, the registration roller pair 25 starts to rotate in time with an image formed on the intermediate transfer belt 31. This rotation start timing is set in such a manner that the paper P coincides with the toner image on the intermediate transfer belt 31 at the secondary transfer position Te.

On the other hand, in the image forming units 10a, 10b, 10c, and 10d, when an image formation start signal is issued, a toner image formed on the photosensitive drum 11d is transferred primarily at the primary transfer position Td to the intermediate transfer belt 31 by the primary transfer charger 35d. This primarily transferred toner image is transported to the next primary transfer position Tc. At this position, image transfer takes place with a delay in time corresponding to a time of toner image transport between the image forming units 10d and 10c. A next toner image is transferred onto the previous image where the two images match with each other. By repeating this process also at the other image forming units 10b and 10a, a four-color toner image is primarily transferred to the intermediate transfer belt 31.

After this, when the sheet P reaches the secondary transfer position Te and comes into contact with the intermediate transfer belt 31, a high voltage is applied to the secondary transfer roller pair 36 being timed with passage of the sheet P. Thus, a four-color toner image formed on the intermediate transfer belt 31, by the above-described process, is transferred to the sheet P. Then, the sheet P is guided by the transport guide 43 to the nip by the fixing rollers 41a, 41b. The toner image is fixed on the sheet P by the heat and the pressure of the nip of the fixing rollers 41a and 41b. Then, the sheet P is transported and discharged to the outside of the color copying machine by the discharge rollers 44, the vertical pass rollers 45a, 45b, and the discharge rollers 48, and is stacked in the discharge tray 47.

The operation of forming images on two sides of a sheet P is now described. When a sheet is supplied from the cassette 21, for example, the sheet P sent out from the cassette 21 undergoes the process described above, and as a result, an image is formed on one side of the sheet P, and the sheet P is subjected to a fixing process by the fixing rollers 41a and 41b.

After the image on one side is fixed, the sheet P is transported by the discharge rollers 44 and the vertical pass rollers 45a. After the trailing edge of the sheet P passes the position 70 and advances for a predetermined distance, transport of the sheet P is started in the opposite direction. A flapper (not illustrated) is provided at the position 70 to prevent the sheet P from being sent to the fixing unit 40. The sheet P, on one side of which an image formation processing has been performed, passes through a two-sided tray 71 and is again transported by the sheet feeding guide 24, and an image is formed on the other side of the sheet similar to the one side, and is fixed by the fixing rollers 41a and 41b. After this, the sheet P is transported by the discharge rollers 44, the two pairs of vertical pass rollers 45a, 45b, and the discharge rollers 48 to be discharged out of the color copying machine, and to be stacked in the discharge tray 47.

Figure 2:
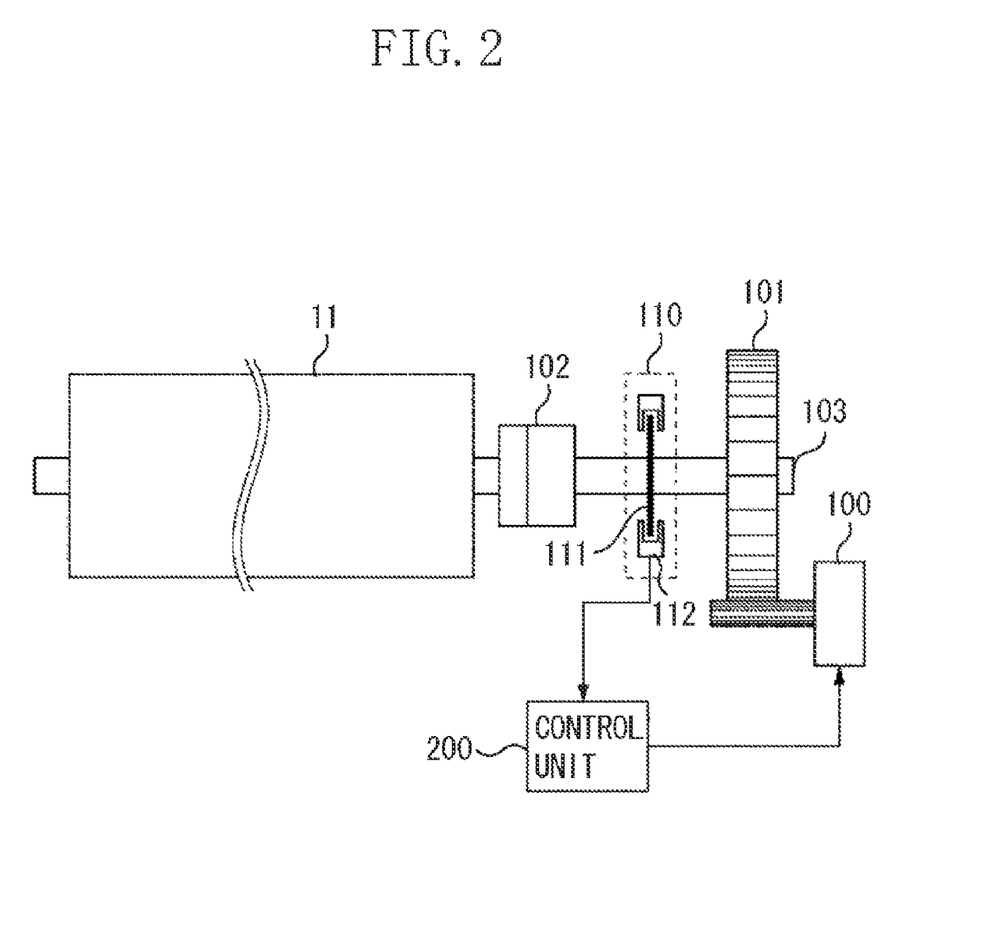
FIG. 2 is a diagram illustrating the drive configuration of a photosensitive drum.

Next, the drive of the photosensitive drums 11 by a motor control apparatus included in an image forming apparatus is described, referring to FIG. 2. In this exemplary embodiment, the photosensitive drums 11a to 11d each include a motor 100, such as a DC brushless motor. The motor is controlled by a control unit 200. A photosensitive drum 11 is rotated by a drive force transmitted via a gear 101, a drive shaft 103, and a coupling 102.

An encoder wheel 111 is fixed to a drive shaft 103, and the drive shaft 103 and the encoder wheel 111 rotate at the same angular speed. An encoder 110 includes the encoder wheel 111 and an encoder sensor 112. The encoder wheel 111 is a transparent circular disk, on which radial black lines are printed at regular intervals around its periphery. The encoder sensor 112 has a light emitting portion and a light receiving portion placed in a manner of holding the disk at diametrically opposite positions. When a black part of the disk comes to the position of the light receiving portion, light to the light receiving portion is blocked, and a transparent part comes to the light receiving portion, the light is incident on the light receiving portion.

The encoder sensor 112 generates a signal depending on whether light enters the light receiving portion. Therefore, the encoder 110 supplies the control unit 200 with a signal of a period corresponding to an angular speed of the drive shaft 103. The control unit 200 controls the motor 100 according to a signal from the encoder 110.

Figure 3:
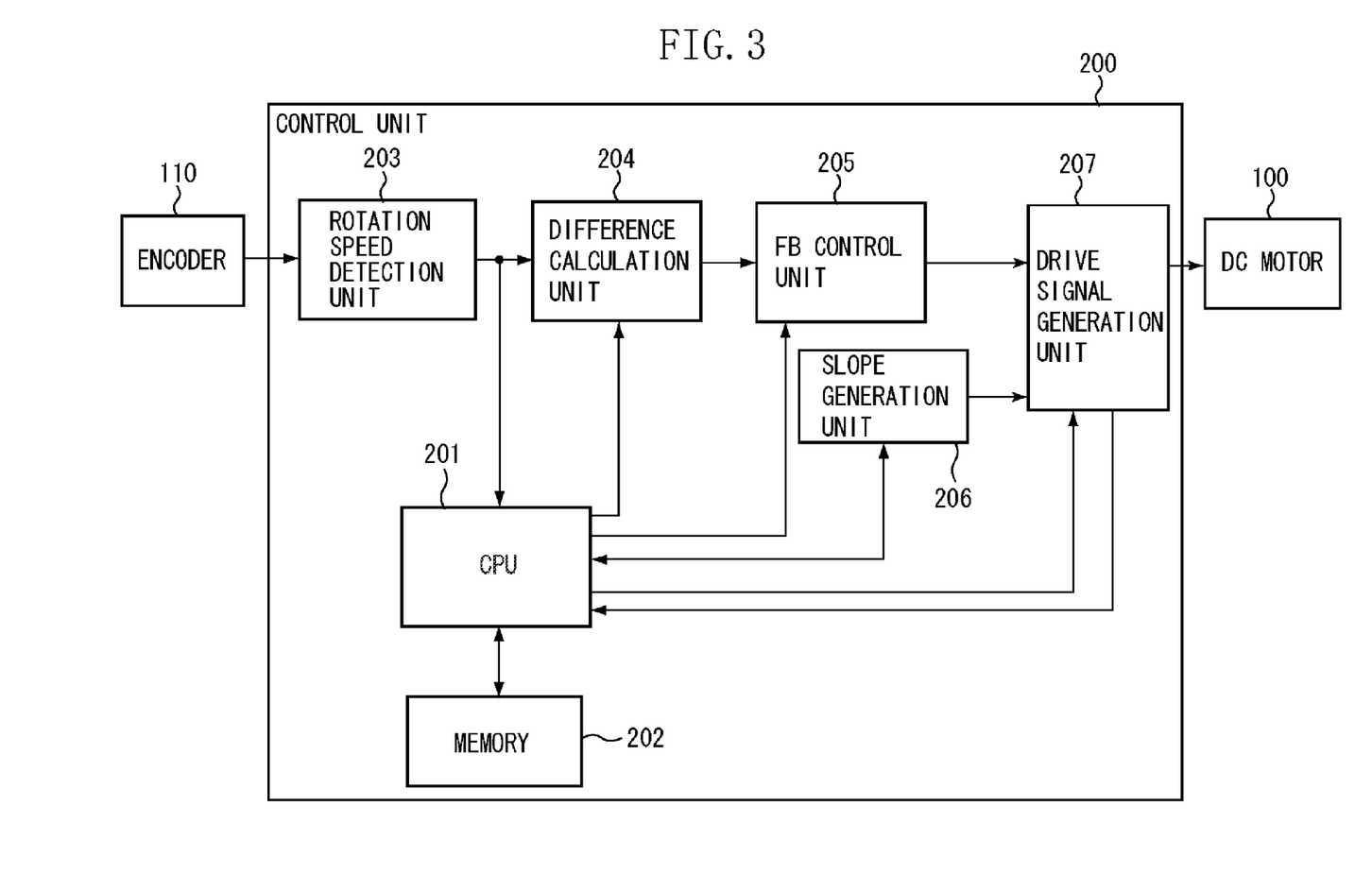
FIG. 3 is a block diagram of a control unit to control a motor.
Figure 4:
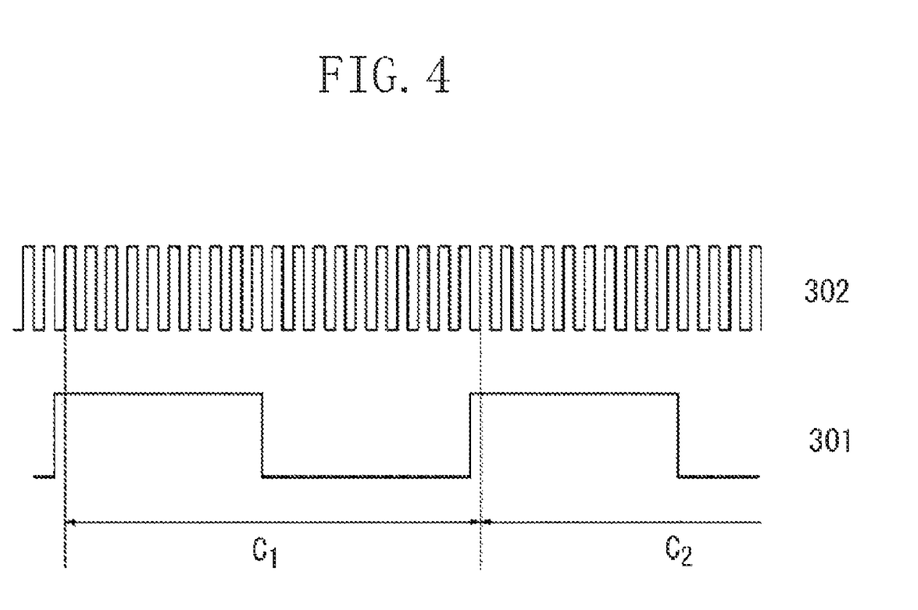
FIG. 4 is a diagram illustrating a detection operation in a rotation speed detection unit.

FIG. 3 is a block diagram of the control unit 200. A rotation speed detection unit 203 detects a pulse width of a pulse signal from the encoder 110. The rotation speed detection unit 203 detects a pulse width of a pulse signal 301 by counting a number of clocks 302 in one period C1 of a pulse signal 301 illustrated in FIG. 4 (C1 is from a leading edge to the next leading edge of a pulse signal 301). A clock 302 is a pulse signal with a period shorter than a period of a pulse signal 301. The clock 302 is generated by a crystal oscillator and input to the rotation speed detection unit 203.

Figure 5A:
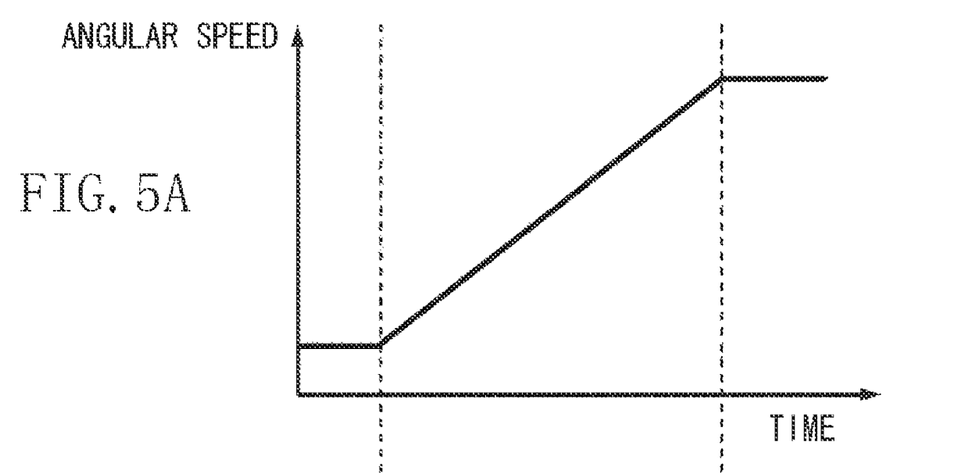
FIGS. 5A and 5B are diagrams illustrating a relation between count numbers and angular speeds in the rotation speed detection unit.
Figure 5B:
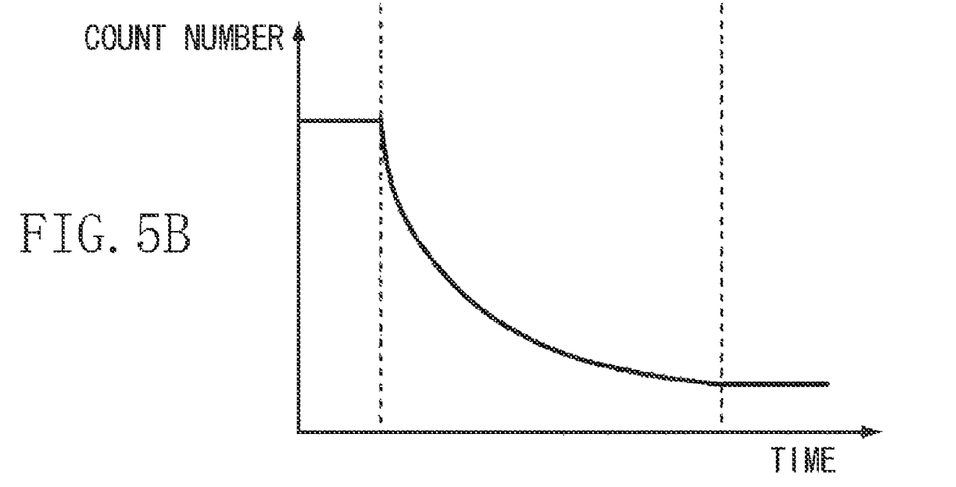

The rotation speed detection unit 203 calculates an angular speed from a detected pulse width. FIG. 5A illustrates changes in the angular speed of the drive shaft 103 of FIG. 3 when the motor 100 is started and accelerated. FIG. 5B illustrates changes in clock counts (a period of a pulse signal) detected by the rotation speed detection unit 203. As is obvious from FIGS. 5A and 5B, the angular speed and the clock count are inversely proportional to each other. Therefore, an angular speed can be calculated by equation (1), in which K is an arbitrary coefficient.

$$\text{Angular speed} = K/\text{count number} \quad (1)$$

A difference calculation unit 204 calculates a difference between a detected angular speed from the rotation speed detection unit 203 and a target angular speed supplied from a CPU 201. The feedback (FB) control unit 205 calculates a correction control value required to rotate the drive shaft 103 at a target angular speed based on a difference value output from the difference calculation unit 204 and feedback gain values $K_P$, $T_I$, and $T_D$ supplied from the CPU 201.

A drive signal generation unit 207 generates a pulse width modulation (PWM) control signal of a duty ratio based on a control value obtained by adding a correction control value from a feedback (FB) control unit 205 and a target control value $N_{TAG}$ from the CPU 201, or a control value output from a slope generation unit 206. The PWM control signal is a signal for pulse width modulation control (PWM control) of the motor 100. The slope generation unit 206 outputs a control value which increases at a constant rate as time passes. The control value may be increased at a predetermined rate but not at a constant rate. To rotate the motor 100 at a constant angular speed, a control value is used which is obtained by adding a correction control value output from the FB control unit 205 and a target control value $N_{TAG}$ output from the CPU 201. When the motor 100 is started and accelerated, a control value output from the slope generation unit 206 is used. That is, the control value supplied to the drive signal generation unit 207 is the control value that controls a driving of the motor 100.

Figure 6:
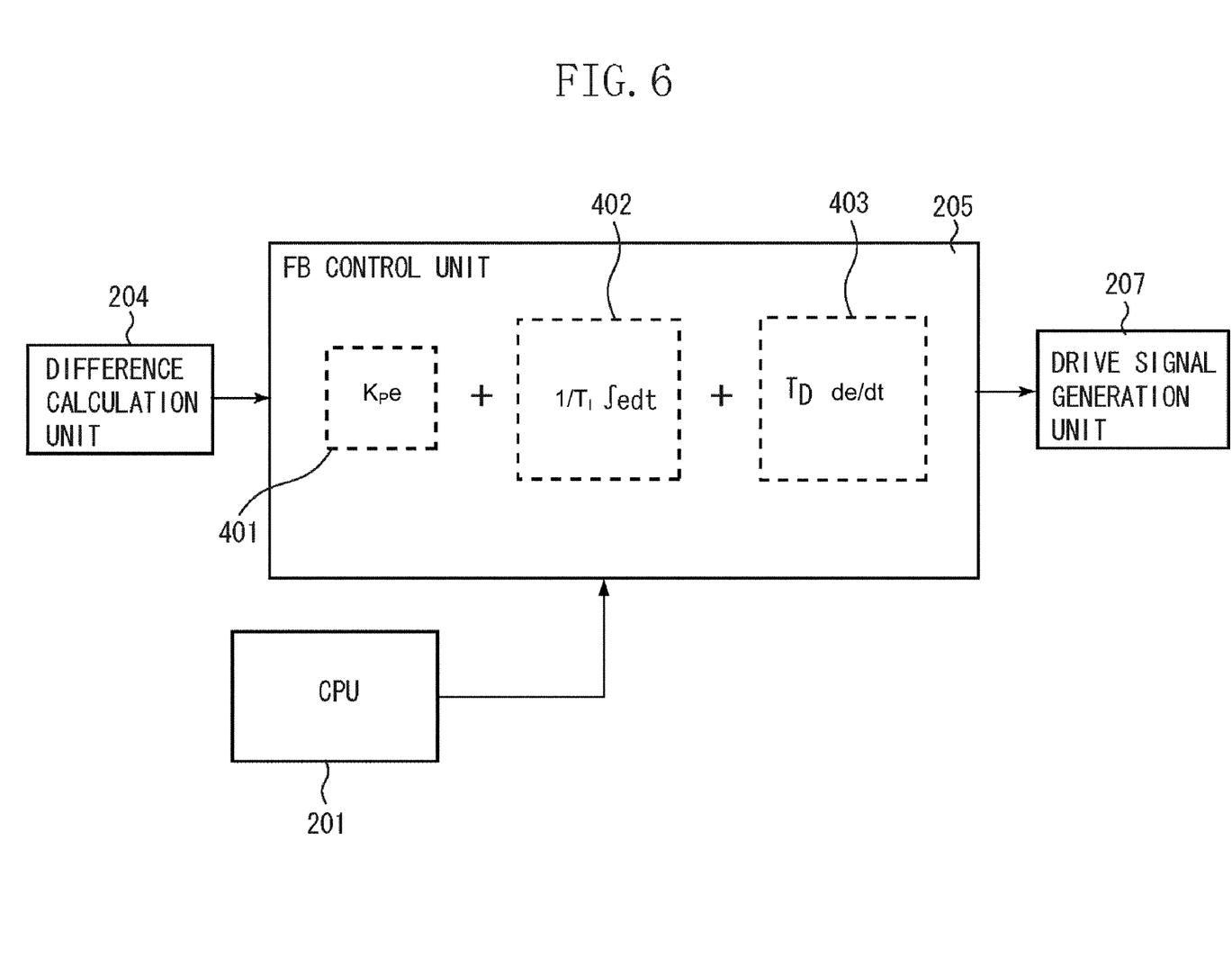
FIG. 6 is a diagram illustrating a process in a feedback (FB) control unit.

FIG. 6 is a diagram illustrating processing in the FB control unit 205. The FB control unit 205 performs PID control based on a difference value e output from the difference calculation unit 204. Control values are calculated by equation 2.

$$K_p e + \frac{1}{T_I} \int e \, dt + T_D \frac{de}{dt}. \quad (2)$$

$K_P$, $T_I$, and $T_D$ are feedback gain values of a proportional term 401, an integral term 402, and a derivative term 403 in PID control, and those gain values are determined by the CPU 201 according to angular speeds of the drive shaft 103.

Figure 7A:
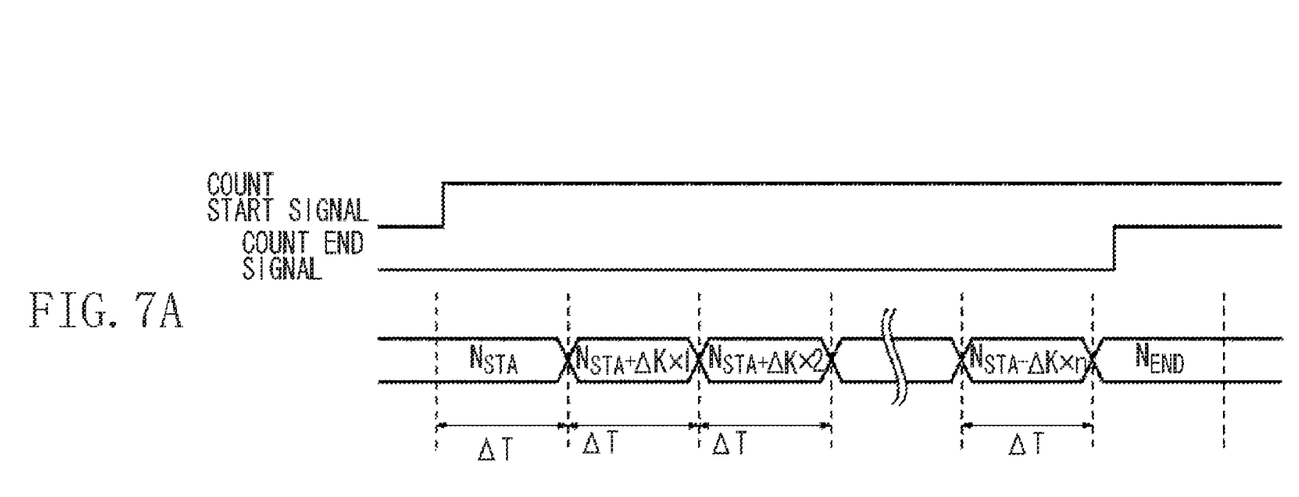
FIGS. 7A and 7B are diagrams illustrating a process in a slope generation unit.
Figure 7B:
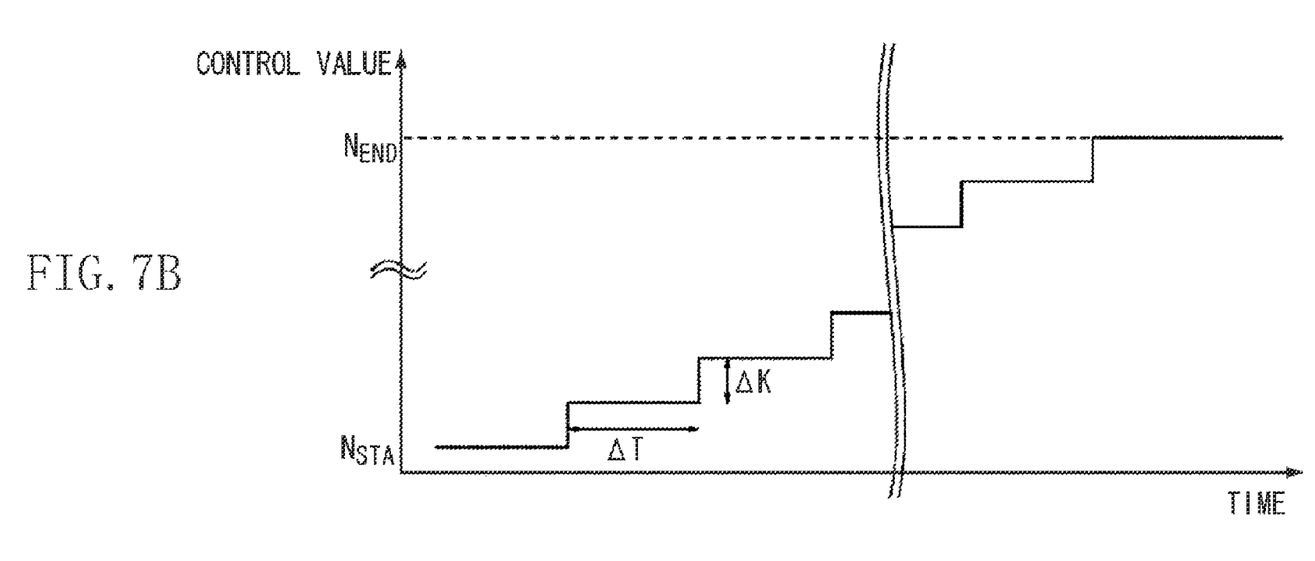

FIGS. 7A and 7B are diagrams for illustrating processing in the slope generation unit 206. The slope generation unit 206 generates a control value that increases linearly at a constant rate as time elapses. The control value may be increased at a predetermined rate but not at a constant rate. As illustrated, in acceleration control, responding to a count start signal from the CPU 201, the slope generation unit 206 starts to increment a predetermined amount ΔK at intervals of predetermined time ΔT from an initial value $N_{STA}$ (first control value) until a maximum value $N_{END}$ (second control value), and outputs thus obtained control values. Before inputting a count start signal to the slope generation unit 206, the CPU 201 sets the initial value $N_{STA}$ and the maximum value $N_{END}$ in the slope generation unit 206. On completing increment up to the maximum value $N_{END}$, the slope generation unit 206 outputs a count end signal to inform the CPU 201 that counting has been completed, and terminates incrementing.

When receiving a control value which increases linearly at a constant rate from the slope generation unit 206, the drive signal generation unit 207 supplies the motor 100 with a PWM control signal having an ON duty ratio that increases linearly at a constant rate. As indicated at t1 to t2 in FIG. 8A, the angular speed of the motor 100 increases linearly following a control value that increases linearly indicated at t1 to t2 in FIG. 8B. However, the angular speed of the motor 100 during acceleration responds with a delay to a PWM control signal with a linearly increasing ON duty ratio, and does not coincide with the angular speed indicated by the PWM control signal. As indicated by the dotted line in FIG. 8B, if the control value is changed in a trapezoidal form, after the increase of the control value is stopped, since feedback control is performed to make the angular speed approach a level corresponding to the control value, the startup characteristics of the angular speed of the motor 100 becomes nonlinear as indicated by the dotted line in FIG. 8A.

Figure 8A:
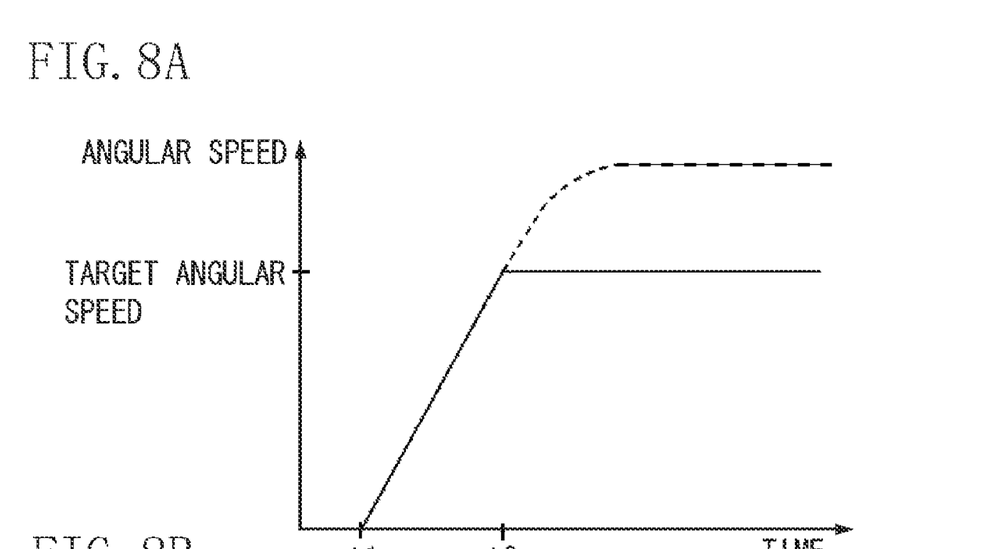
FIGS. 8A and 8B are diagrams illustrating a relation between control values and angular speeds.

The CPU 201 sets the maximum value $N_{END}$ (by further incrementing a predetermined amount ΔK and a predetermined time ΔT if necessary) to a value that makes the angular speed increase linearly as indicated in FIG. 8A until the angular speed of the motor 100 reaches at least the target angular speed. More specifically, the maximum value $N_{END}$ is set to a value obtained by adding some percent to the target control value $N_{TAG}$ so that the angular speed of the motor reaches the target angular speed earlier than an increased control value reaches the maximum control value $N_{END}$.

In this exemplary embodiment, as the maximum angular speed, the CPU 201 sets a control value corresponding to an angular speed, which is the target angular speed increased by 10 percent. More specifically, the control value input to the motor 100 is increased linearly at a constant rate from a first control value corresponding to an angular speed lower than the target angular speed to a second control value corresponding to an angular speed higher than the target angular value. That is, the control value is increased such that the angular speed of the motor 100 linearly increases to the target angular speed while the motor 100 is accelerated. In other words, feedforward control is performed in which a control value input to the motor is increased linearly from a first control value corresponding to an angular speed lower than the target angular speed to a second control value corresponding to an angular speed higher than the target angular speed.

Figure 8B:
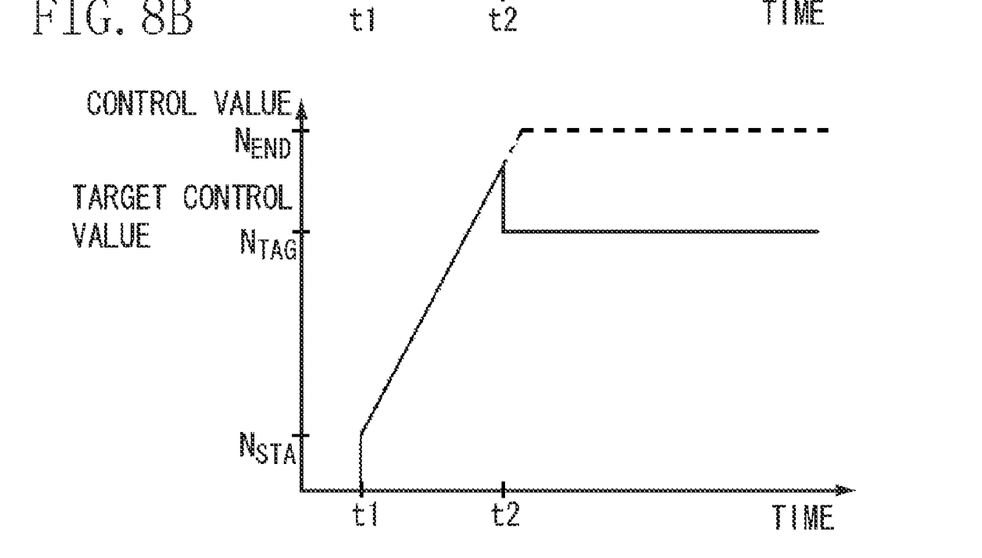

The CPU 201 accelerates the motor 100 based on a control value output from the slope generation unit 206 as indicated by t1 to t2 in FIG. 8B until the motor 100 reaches the target angular speed (till t2 in FIG. 8B). When the motor 100 has reached the target angular speed (at t2 in FIG. 8A), the CPU 201 controls the motor 100 based on a control value representing the target angular speed as indicated by the solid line from t2 on in FIG. 8B. When the motor 100 reaches the target angular speed, the control value to be input to the motor 100 is switched to a level to maintain the motor 100 at the target angular speed based on a detection result of the rotation speed detection unit 203. In other words, when the motor 100 has reached the target angular speed, the CPU 201 switches to feedback control to maintain the motor 100 at the target angular speed based on a detection result of the rotation speed detection unit 203.

The predetermined time ΔT and the predetermined amount 66 K are determined by the performance of the motor 100 and the torque and the inertia of the load. For example, if a motor of a rated output of 15 W is connected to a load of 30 m·Nm and an inertia of 400 g·cm² (including a motor), it is preferable that ΔT and ΔK are set at values which enable the rotation number of the motor 100 to be increased from 0 rpm to 2000 rpm in about 300 ms. The initial value $N_{STA}$ is preferably at a value that allows the motor 100 to start to rotate, and in this exemplary embodiment, the PWM control signal has the ON duty ratio of about 10% to 20%.

Figure 9:
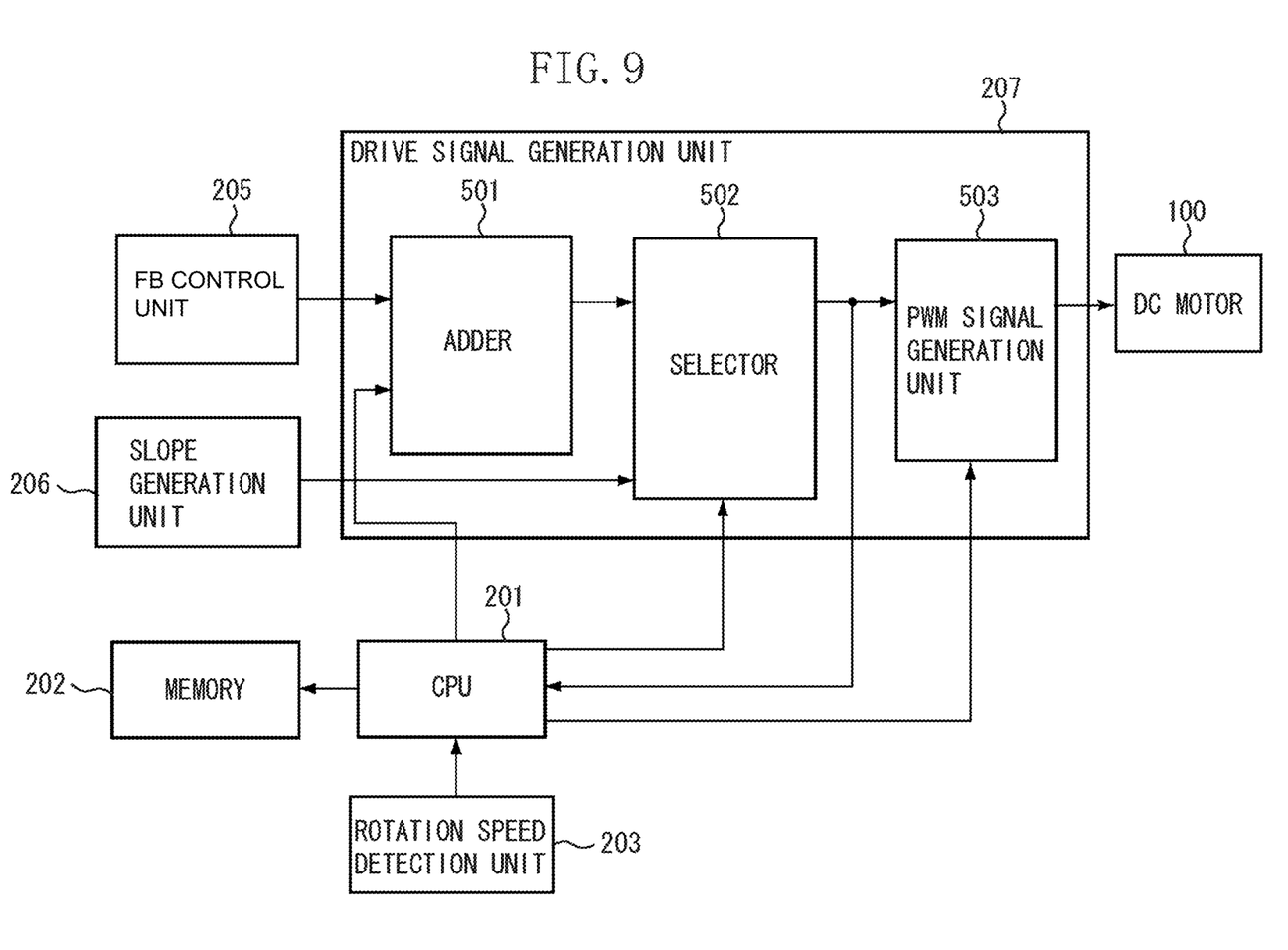
FIG. 9 is a block diagram of a drive signal generation unit.

FIG. 9 is a block diagram of the drive signal generation unit 207. A control value from the FB control unit 205 and a control value representing a target angular speed from the CPU 201 are added by an adder 501. A control value as a result of addition in the adder 501 and a control value generated in the slope generation unit 206 are input to a selector 502. Based on a signal from the CPU 201, the selector 502 selects either one of the control value from the slope generation unit 206 and the control value from the adder 501. To accelerate the motor 100, according to a detection result of the rotation speed detection unit 203, the CPU 201 causes the selector 502 to select the control value from the slope generation unit 206 until the target angular speed is reached, and causes the selector 502 to select the control value from the adder 501 after the target angular speed has been reached.

The PWM signal generation unit 503 generates a PWM control signal based on the control signal from the selector 502 and information about PWM frequency from the CPU 201, and supplies the PWM control signal to the motor 100. The CPU 201 calculates an average value of control values (PWM duty ratio) while the selector 502 is selecting a control value from the adder 501 (during feedback control by the FB control unit 205), and stores this average control value in the memory 202. When the motor 100 is started and accelerated next time, the CPU 201 inputs the average control value from the memory 202 to the adder 501.

Figure 10:
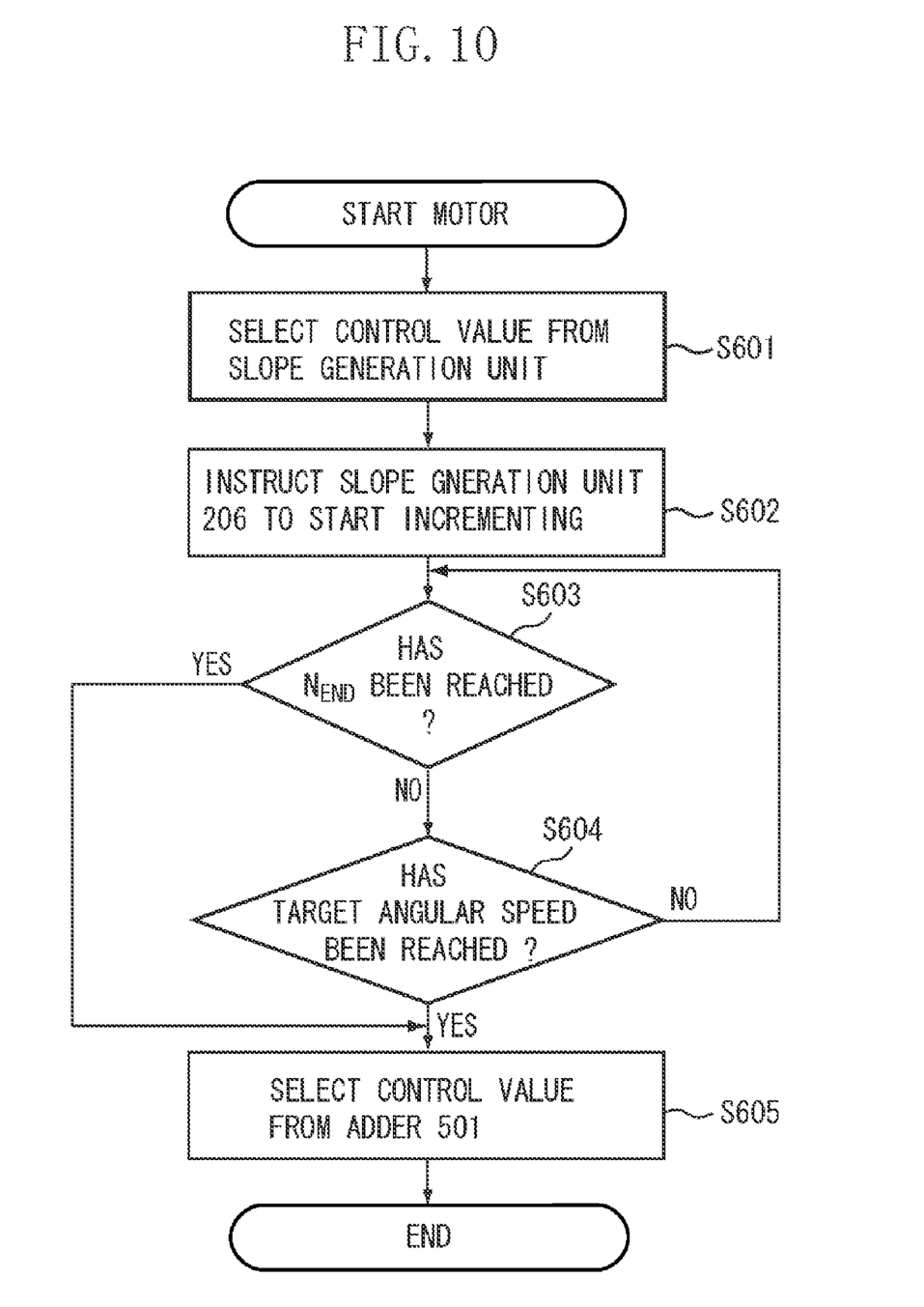
FIG. 10 is a flowchart illustrating steps to be performed when a motor is started and accelerated.

FIG. 10 is a flowchart illustrating steps to be performed when the motor 100 is started and accelerated. The CPU 201 instructs the selector 502 of the drive signal generation unit 207 to select a control value from the slope generation unit 206 (step S601). The CPU 201, by issuing a count start signal, causes the slope generation unit 206 to start to increment the control value from initial value $N_{STA}$ to the maximum value $N_{END}$ (step S602). A control value incremented by the slope generation unit 206 is input to the selector 502.

While the slope generation unit 206 is incrementing the control value, the CPU 201 monitors if a count end signal is output from the slope generation unit 206 to determine whether the control value, which is being incremented, has reached the maximum value $N_{END}$ (step S603). In step S603, if the maximum value $N_{END}$ has not been reached, the CPU 201 determines from a detection result of the rotation speed detection unit 203 whether the motor 100 has reached the target angular speed (step S604). If, in step S604, the target angular speed has not been reached, the process returns to step S603, and if the motor has reached the target angular speed, the CPU 201 instructs the selector 502 of the drive signal generation unit 207 to select a control value from the adder 501 (step S605). As described above, since the target angular speed is being input from the CPU 201 to the difference calculation unit 204 and the adder 501, a control value selected by the selector 502 from the adder 501 is a value which maintains the motor 100 at the target angular speed. In other words, a control value selected by the selector 502 from the adder 501 is a value that corresponds to the target angular speed. If the motor 100 reaches the maximum value $N_{END}$ in step S603 before reaching the target angular speed at a predetermined time, the process advances to step S605.

While the selector 502 is in the process of selecting a control value from the slope generation unit 206, the CPU 201 continuously resets the FB control unit 205 to prevent the FB control unit 205 from being reset in response to the selector 502 switching to a control value from the FB control unit 205 (the adder 501), and in response to the selector 502 switching to a control value from the FB control unit 205 (the adder 501), the CPU 201 no longer resets the FB control unit 205.

By the processing described above, when the motor 100 is started and accelerated, the angular speed of the motor 100 can be started and accelerated at the angular speed in a trapezoidal form illustrated in FIG. 8A. By applying this type of control to the motor 100 that drives the photosensitive drums 11 and a motor that drives the drive roller 32 to rotate the intermediate transfer belt 31, their angular speeds can be increased in a trapezoidal form. If either the motor of the photosensitive drums 11 or the motor of the intermediate transfer belt 31 is a stepping motor, the DC motor can be started and accelerated by control described above and the stepping motor can be started and accelerated by a well-known control method in a trapezoidal form, respectively. Therefore, the difference in circumferential speed between the photosensitive drums 11 and the intermediate transfer belt can be eliminated, and slippage that occurs between the photosensitive drums and the intermediate transfer belt in the primary transfer section can be prevented and abrasion or scars on their surfaces can be prevented.

When this type of control is applied to a motor 100 to drive photosensitive drums 11, and a motor which drives a drive roller 32 to rotate an intermediate transfer belt 31, an image forming apparatus is configured as follows.

An image forming apparatus includes a first DC motor configured to drive photosensitive drums 11, a second DC motor configured to drive a roller that rotates an intermediate transfer belt 31, a first detection unit configured to detect an angular speed of the photosensitive drums 11, a second detection unit configured to detect an angular speed of the roller. The first control unit, when the first DC motor is started and accelerated, increase a control value that controls a driving of the first DC motor at a first predetermined rate from a first control value corresponding to an angular speed lower than a first target angular speed up to a second control value corresponding to an angular speed higher than the first target angular speed, and switches the control value that controls the driving of the first DC motor to a control value corresponding to the first target angular speed in response to the detection result of the first detection unit reaching the first target angular speed. The second control unit, when the second DC motor is started and accelerated, increase a control value that controls a driving of the second DC motor at a second predetermined rate from a third control value corresponding to an angular speed lower than a second target angular speed up to a fourth control value corresponding to an angular speed higher than the second target angular speed, and switches the control value that controls the driving of the second DC motor to a control value corresponding to the second target angular speed in response to the detection result of the second detection unit reaching the second target angular speed.

According to this exemplary embodiment, the angular speed of the motor 100 is detected by the encoder 110 mounted on the drive shaft 103. However, an angular speed may be detected according to a frequency generator (FG) signal from the motor 100. The above-described processing may be performed according to a result of detection of the circumferential speed or circulation speed of the photosensitive drum or the intermediate transfer belt 31.

In this exemplary embodiment, the angular speed of the motor 100 is controlled by PWM based on control values, but the angular speed of the motor 100 may be controlled by varying supply voltage based on control values.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-046210 filed Feb. 27, 2009, which is hereby incorporated by reference herein in its entirety.

What is claimed is:

1. A motor control apparatus for controlling a direct current (DC) motor, the apparatus comprising:
a detection unit configured to detect an angular speed of the DC motor;
a generation unit configured to gradually increase a third control value from a first control value corresponding to an angular speed lower than a target angular speed to a second control value corresponding to an angular speed higher than the target angular speed;
a feedback control unit configured to calculate a fourth control value based on the target angular speed and the detection result of the detection unit and generate a sixth control value based on the fourth control value and a fifth control value corresponding to the target angular speed, the fifth control value being higher than the first control value and being lower than the second control value; and
a control unit configured to, when the DC motor is accelerated to target angular speed, control a driving of the DC motor based on the third control value, and switch the third control value to the sixth control value in response to the detection result of the detection unit reaching the target angular speed.

2. The motor control apparatus according to claim 1, wherein the third and sixth control values are speed instruction values.

3. The motor control apparatus according to claim 1, further comprising:
a signal generation unit configured to generate a signal to perform pulse width modulation control of the DC motor according to the third or sixth control value from the control unit.

4. An image forming apparatus including the motor control apparatus according to claim 1, wherein the DC motor drives a photosensitive drum or an intermediate transfer belt to form an image on paper.

5. The image forming apparatus according to claim 4, wherein the detection unit is an encoder configured to detect an angular speed of a drive shaft of the photosensitive drum or the intermediate transfer belt.

6. The motor control apparatus according to claim 1, wherein the generation unit linearly increases the third control value from the first control value to the second control value.

7. The motor control apparatus according to claim 6, wherein the generation unit linearly increments the third control value by a predetermined amount for every predetermined time.

8. A motor control apparatus for controlling a direct current (DC) motor, the apparatus comprising:
a detection unit configured to detect an angular speed of the DC motor;
a slope generation unit configured to generate a control value increasing from a first control value corresponding to an angular speed lower than a target angular speed to a second control value corresponding to an angular speed higher than the target angular speed at a constant rate;
a feedback control unit configured to perform a feedback control on the DC motor in accordance with the detection result of the detection unit; and
a selecting unit configured to select the slope generation unit until the detection result of the detection unit reaches the target angular speed and select the feedback control unit in response to the detection result of the detection unit reaching the target angular speed.

9. The motor control apparatus according to claim 8, wherein the control unit selects the feedback control unit after resetting the feedback control unit in response to the detection result of the detection unit reaching the target angular speed.

10. An image forming apparatus comprising:
a photosensitive member;
an intermediate transfer member configured to transfer an image on the photosensitive member to a recording sheet;
a first direct current (DC) motor configured to drive the photosensitive member;
a second DC motor configured to drive a roller that rotates the intermediate transfer member;
a first detection unit configured to detect an angular speed of the photosensitive member;

a second detection unit configured to detect an angular speed of the roller;

a first control unit configured to, when the first DC motor is accelerated, increase a control value that controls a driving of the first DC motor at a predetermined rate from a first control value corresponding to an angular speed lower than a first target angular speed up to a second control value corresponding to an angular speed higher than the first target angular speed, and switch the control value that controls the driving of the first DC motor to a control value corresponding to the first target angular speed in response to the detection result of the first detection unit reaching the first target angular speed; and a second control unit configured to, when the second DC motor is accelerated, increase a control value that controls a driving of the second DC motor at a predetermined rate from a third control value corresponding to an angular speed lower than a second target angular speed up to a fourth control value corresponding to an angular speed higher than the second target angular speed, and switch the control value that controls the driving of the second DC motor to a control value corresponding to the second target angular speed in response to the detection result of the second detection unit reaching the second target angular speed.

* * * * *